(12) United States Patent
Hsu

(10) Patent No.: US 8,302,983 B1
(45) Date of Patent: Nov. 6, 2012

(54) RESTRICTION UNIT FOR INNER TUBE OF BICYCLE SEAT TUBE ASSEMBLY

(76) Inventor: Jung Yu Hsu, Tainan (TW)

(*) Notice: Subject to any disclaimer, the term of this patent is extended or adjusted under 35 U.S.C. 154(b) by 0 days.

(21) Appl. No.: 13/271,654

(22) Filed: Oct. 12, 2011

(51) Int. Cl.
*B62K 1/00* (2006.01)

(52) U.S. Cl. .............. 280/281.1; 297/199; 297/344.16

(58) Field of Classification Search ........... 280/281.1, 280/283, 274; 297/199, 344.16; 267/132
See application file for complete search history.

(56) References Cited

U.S. PATENT DOCUMENTS

| | | | |
|---|---|---|---|
| 5,324,058 A * | 6/1994 | Massaro | 280/283 |
| 5,927,738 A * | 7/1999 | Kesinger | 280/220 |
| 6,220,581 B1 * | 4/2001 | Mueller | 267/64.11 |
| 6,631,947 B2 * | 10/2003 | Faltings | 297/195.1 |
| 7,828,313 B1 * | 11/2010 | Cienfuegos | 280/281.1 |
| 7,909,348 B2 * | 3/2011 | Klieber | 280/288.4 |
| 2012/0098175 A1 * | 4/2012 | Wu | 267/132 |

* cited by examiner

Primary Examiner — Tony Winner
(74) Attorney, Agent, or Firm — Rosenberg, Klein & Lee

(57) ABSTRACT

A bicycle seat tube assembly includes an outer tube and an inner tube is movably inserted into the outer tube. A valve unit has a first end fixed to the first end cap and a second end of the valve unit is inserted into the inner tube so as to define the interior space of the inner tube into a first oil room and a second oil room. The valve unit regulates volume of oil between the first and second oil rooms. A restriction unit includes a flange on the inner periphery of the inner tube and a stop member located on the valve unit. The stop member contacts the flange when the inner tube moves to a position so as to restrict the inner tube from dropping out from the outer tube.

10 Claims, 4 Drawing Sheets

RESTRICTION UNIT FOR INNER TUBE OF BICYCLE SEAT TUBE ASSEMBLY

FIELD OF THE INVENTION

The present invention relates to a restriction unit, and more particularly, to a restriction unit for restricting the movement of the inner tube relative to the outer tube of bicycle seat tube assembly.

BACKGROUND OF THE INVENTION

A conventional bicycle seat tube assembly generally includes a seat post which has a clamp unit for securing the seat on the top thereof and the seat post is inserted into the seat tube of the bicycle frame. Some of the seat tube assemblies can adjust the height of the seat and the tilt angle of the seat so as to meet different requirement for different users.

The conventional height adjustable seat tube assembly includes an inner tube which is movable linearly relative to an outer tube so as to adjust the height of the seat which is connected to the top of the inner tube. The conventional height adjustable devices comprise mechanical adjustable device, hydraulic adjustable device and hybrid adjustable device. The mechanical adjustable device uses mechanical way to move the inner tube relative to the outer tube. The hydraulic adjustable device uses hydraulic force to move the inner tube relative to the outer tube. The hybrid adjustable device uses both of the hydraulic force and pneumatic force to move the inner tube relative to the outer tube.

For the hydraulic height adjustable device and the hybrid height adjustable device, each of which generally includes a clamp unit, a seat post, an outer cylinder, an inner cylinder, a valve unit and a driving device. The valve unit is usually fixed to the lower end of the seat post or the outer cylinder. The valve unit regulates the volume of the hydraulic liquid in the two oil rooms. The position of the valve unit relates the space and the related positions between the parts.

Because the inner tube is linearly movable in the outer tube, and both of the inner and outer tubes are circular tubes, so that the inner tube may be rotatable relative to the outer tube. Therefore, a restriction unit for prevention of rotation of the inner tube relative the outer tube is developed and installed between the inner and outer tubes. By the restriction unit, the force that moves the inner tube relative to the outer tube is not used on the rotation of the inner tube relative to the outer tube.

Taiwan Utility Model 099117817 discloses a first tube having a first end and a second end, a second tube having a first end and a second end, wherein the first end of the second tube is opened so that the second end of the first tube is inserted into the first end of the second tube. A piston located in the hole of the first tube and forms an air room between the piston and the first end of the first tube. A valve unit is stationary relative to the second tube and defines a first oil room and a second oil room in the first tube. The first oil room is located between the valve unit and the piston, and the second oil room is located between the valve unit and the second end of the firs tube. The valve unit has a first check valve and a second check valve, wherein the first check valve stops the oil flow from the first oil room to the second oil room, and allows the oil flow from the second oil room to the first oil room. The second check valve stops the oil flow from the second oil room to the first oil room, and allows the oil flow from the first oil room to the second oil room. A movable control member is movable between the first and second check valves. When the movable control member is located at the first position, the oil passes through the first check valve and flows from the second oil room to the first oil room. When the movable control member is located at the second position, the oil passes through the second check valve and flows from the first oil room to the second oil room.

Taiwan Utility Model 099220386 discloses a first piston unit comprising a first cylinder, a first piston and an end cap. The first cylinder is connected to the bicycle frame and the first piston has a hollow interior space, the first end of the first piston is inserted into the first cylinder. The end of the first piston has a through hole. The second end of the first piston is connected to the bicycle seat. A gap is defined between the first piston and the first cylinder, the gap communicates with the interior of the first piston. The end cap is located at the opening of the first cylinder so as to seal the gap. A second piston unit comprises a second cylinder and a second piston. The second cylinder is located in the first piston and communicates with the interior of the first piston. The area of the cross section of the first cylinder is the same as the area of the cross section of the gap. The first end of the second piston extends through the through hole of the first piston and inserted into the second cylinder so that the gap, the interior of the first piston and the second cylinder form a first closed space. The second end of the second piston is connected to the inside of the first cylinder. The second piston has a hollow interior and communicates with the first cylinder so that the interior of the first cylinder and the interior of the second piston form a second closed space. A control valve is connected between the first piston and the second cylinder so as to control the communication between the first piston and the second cylinder. The first closed spaces stores oil and the second closed space stores air.

Both of the two examples mentioned above have a valve unit located at the underside of the outer cylinder and a restriction unit for prevention of rotation. The first embodiment shows the longitudinal slot in the inner tube and a key is engaged with the slot so as to prevent the inner tube from rotating relative to the outer tube. The restriction unit of the second embodiment has two flat surfaces located in the through hole and the outside of the piston, the two flat surfaces are matched with each other so as to prevent the two parts from rotating relative to each other.

However, the restriction unit cannot prevent the inner tube from dropping out from the outer tube and the leakage of the hydraulic oil. When the seat is adjusted, the inner tube is easily pulled out from the outer tube.

The present invention intends to provide a restriction unit for restricting the movement of the inner tube relative to the outer tube of bicycle seat tube assembly.

SUMMARY OF THE INVENTION

The present invention relates to a bicycle seat tube assembly and comprises an outer tube which is a hollow tube and has a first end cap sealing the first end of the outer tube. An inner tube is a hollow tube and has a first end thereof inserted into the outer tube. The inner tube is movable linearly in the outer tube and the second end of the inner tube is connected with a clamp unit. A valve unit has a first end fixed to the first end cap and a second end of the valve unit is inserted into the inner tube so as to define the interior space of the inner tube into a first oil room and a second oil room. The valve unit regulates volume of oil between the first and second oil rooms. The inner tube is linearly movable between the outer tube and the valve unit. A restriction unit has a flange extending inward from the inner periphery of the inner tube. A stop member is located on the valve unit and contacts the flange when the inner tube moves to a position so as to restrict the inner tube from dropping out from the outer tube.

The primary object of the present invention is to provide a bicycle seat tube assembly which has a restriction unit located between the valve unit and the inner tube so as to restrict the linear movement of the inner tube in the outer tube.

Another object of the present invention is to provide a bicycle seat tube assembly which has a restriction unit located between the valve unit and the inner tube, when the seat is adjusted to a high position, the restriction unit prevents the inner tube from dropping out from the outer tube.

Yet another object of the present invention is to provide a bicycle seat tube assembly which has a restriction unit made by soft material which absorbs impact when the stop member is stopped by the flange when adjusting the bicycle seat.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
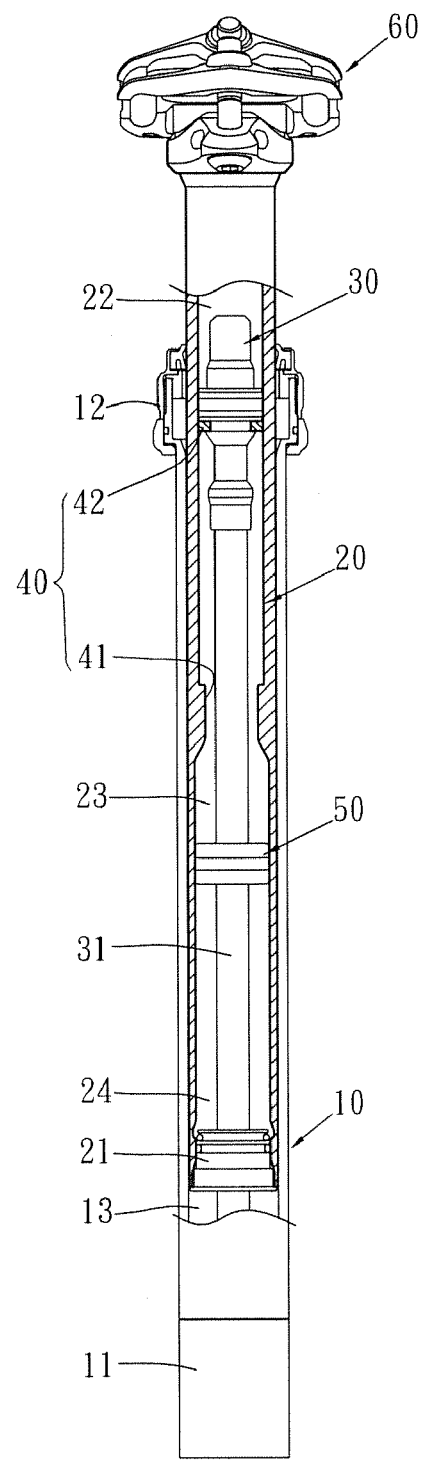
FIG. 1 is a cross sectional view of the bicycle seat tube assembly of the present invention.
Figure 2:
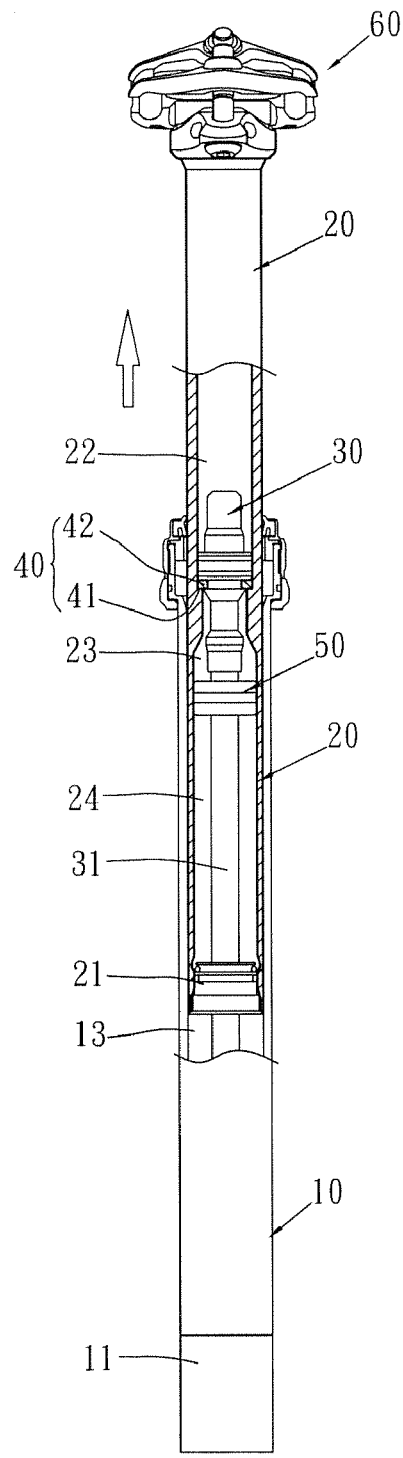
FIG. 2 is a cross sectional view of the bicycle seat tube assembly of the present invention, wherein the inner tube is adjusted to a higher position.

Referring to FIGS. 1 and 2, the bicycle seat tube assembly of the present invention comprises an outer tube 10, an inner tube 20 inserted in the outer tube 10, a valve unit 30 located in the inner tube 20, a restriction unit 40 located between the valve unit 30 and the inner tube 20, and a movable unit 50.

The outer tube 10 is a hollow tube and a first end cap 11 seals the first end of the outer tube 10. A locking unit 12 is connected to and seals the second end of the outer tube 10.

The inner tube 20 is a hollow tube and has a first end thereof extending through the locking unit 12 and inserted into the outer tube 10. The inner tube 20 is movable linearly in the outer tube 10. The second end of the inner tube 20 is connected with a clamp unit 60. The second end cap 21 is located to seal the end of the inner tube 20 and the sealed end of the inner tube 20 is inserted into the outer tube 10. A first air room 13 is defined between the second end cap 21 and the inner periphery of the inner tube 10. Pressurized air is filled in the first air room 13.

The valve unit 30 has a first end fixed to the first end cap 11 and a second end of the valve unit 30 is inserted into the inner tube 20 and defines the interior space of the inner tube 20 into a first oil room 22 and a second oil room 23. The valve unit 30 regulates volume of oil flowing between the first and second oil rooms 22, 23. The inner tube 20 is linearly movable between the outer tube 10 and the valve unit 30. The valve unit 30 has a rod 31 which has an end fixed to the end cap 11.

The restriction unit 40 has a flange 41 extending inward from the inner periphery of the inner tube 20. The flange 41 is integrally formed to the inner tube 20 and located at a position where the inner tube 20 reaches a maximum distance that the inner tune 20 is exposed from the outer tube 10. A stop member 42 is located on the valve unit 30 and is preferably made by soft material or plastic material. The stop member 42 contacts the flange 41 when the inner tube 20 moves so as to restrict the inner tube 20 from dropping out from the outer tube 10.

The movable unit 50 is mounted to the rod 31 in the second oil room 23 and is linearly movable along the rod 31. The outer periphery of the movable unit 50 contacts the inner periphery of the inner tube 20. A second air room 24 is defined in the inner tube 20 and between the movable unit 50 and the second end cap 21. A second oil room 23 is defined in the inner tube 20 and between the other side of the movable member 50 and the valve unit 30.

By the restriction unit 40 located between the inner tube 20 and the valve unit 30, the inner tube 20 is prevented from dropping out from the outer tube 10 when linearly moving the inner tube 20 relative to the outer tube 10.

The present invention is used for the hybrid height adjustable seat tube assembly wherein the valve unit is located at the lower end of the outer tube. The rod 31 of the valve unit 30 extends downward and is fixed with the first end cap 11. The inner tube 20 extends through the locking unit 12 and is inserted into the outer tube 10. The valve unit 30 extends through the second end cap 21 and is inserted into the inner tube 20 so as to define the first and second oil rooms 22, 23 in the inner tube 20. The movable unit 50 is mounted to the rod 31 and defines the second oil room 23 and the second air room 24 on two sides of the movable unit 50. Therefore, there are first and second oil rooms 22, 23 and the second air room 24 in the inner tube 20. The two sides of the movable unit 50 is applied by the pressure from the hydraulic oil in the second oil room 23 and the air pressure from the second air room 24. The movable unit 50 moves by the pressure from the hydraulic oil or the air. Therefore, the movable unit 50 is automatically regulates the pressure in the inner tube 20.

As shown in FIG. 2, when the inner tube 20 is moved in a direction away from the outer tube 10 to a higher position, the valve unit 30 is stationary, so that only the inner tube 20 is linearly moved. When the flange 41 contacts the stop member 42, the inner tube 20 cannot be moved further and this position is the maximum distance that the inner tube can be moved, wherein the seat is located at the highest position.

When the inner tube 20 is moved in a direction toward the outer tube 10 to a lower position, the flange 41 is moved away from the stop member 42. The inner tube 20 is moved until it cannot be moved further because the pressurized air stops the movement of the inner tube 20, and this position is the maximum distance that the inner tube can be moved toward the outer tube 10, wherein the seat is located at the lowest position.

The range of the inner tube 20 is the sum of the maximum distance that the inner tube 20 is inserted into the outer tube 10 and the maximum distance that the inner tube 20 is exposed from the outer tube 10.

The flange 41 is integrally formed to the inner tube 20 so that the assembling is easy and quickly. The flange 41 is moved quickly by the hydraulic/pneumatic force to adjust the inner tube 20, and then contacts the stop member 42. The soft or plastic material of the stop member 42 absorbs the impact force of the flange 41.

The locking unit 12 effectively seals the outer tube 10 and prevents the air from leaking from the outer tube 10, and guides the inner tube 20 to move linearly.

The second end cap 21 also seals the inner tube 20 and prevents the air from leaking from the inner tube 20, and allows the rod 31 to extend therethrough so that the inner tube 20 moves linearly along the rod 31.

Figure 3:
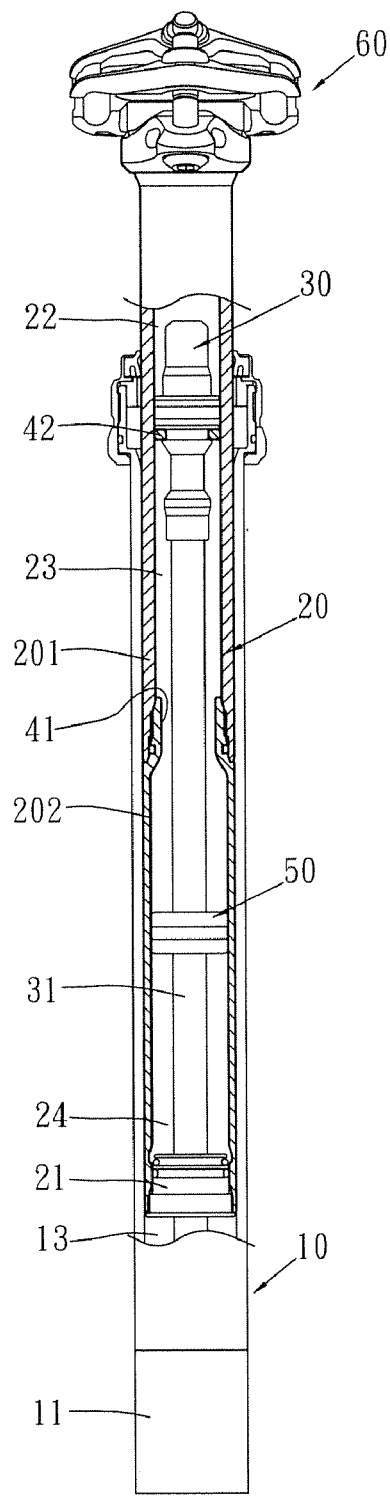
FIG. 3 is a cross sectional view of another embodiment of the bicycle seat tube assembly of the present invention.
Figure 4:
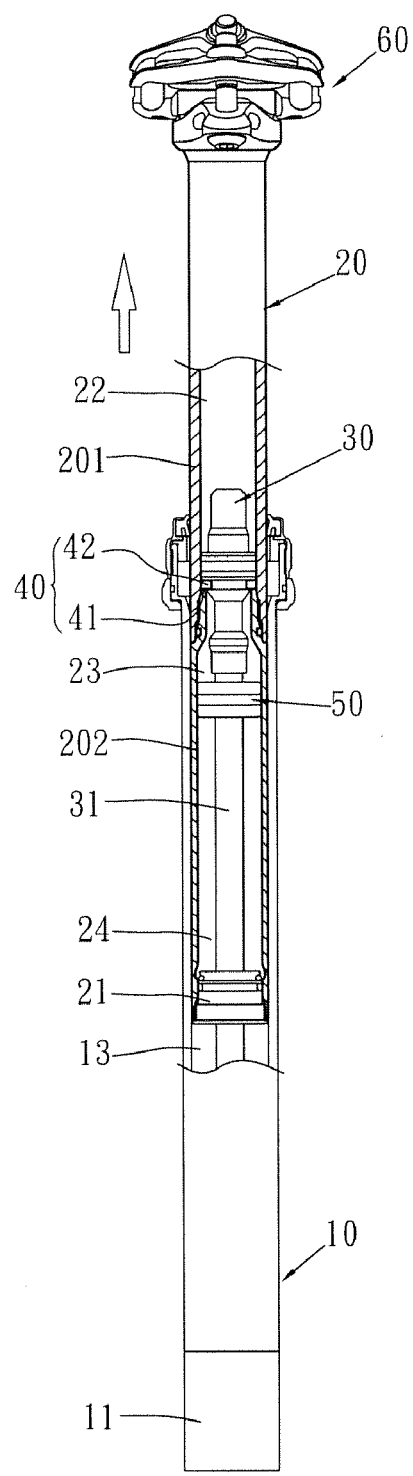
FIG. 4 is a cross sectional view of the embodiment in FIG. 3, wherein the inner tube is adjusted to a higher position.

FIGS. 3 and 4 show the second embodiment of the present invention, wherein the inner tube 20 comprises a first tube 201 and a second tube 202. The second tube 202 has a narrow end inserted into the first tube 201 and the flange 41 is formed on the narrow end of the second tube 202. The thickness of the end of the second tube 202 is convex or thicker when compared with the thickness of the first tube 201, so that when the first and second tubes 201, 202 are moved in the direction away from the outer tube 10, the end of the second tube 202 forms the flange 41 will contact the stop member 42 to prevent the inner tube 20 from moving further and stops the inner tube 20.

The present invention provides a restriction unit 40 which restricts the travel distance of the inner tube 20 relative to the outer tube 10, so that the inner tube 20 does not unexpectedly drop out from the outer tube 10 when adjusting the seat. The hydraulic oil or pneumatic air does not leak by the restriction to the inner tube 20.

While we have shown and described the embodiment in accordance with the present invention, it should be clear to those skilled in the art that further embodiments may be made without departing from the scope of the present invention.

What is claimed is:

1. A bicycle seat tube assembly comprising:
    an outer tube being a hollow tube and having a first end cap sealing a first end of the outer tube;
    an inner tube being a hollow tube and having a first end thereof inserted into the outer tube, the inner tube being movable linearly in the outer tube, a second end of the inner tube connected with a clamp unit;
    a valve unit having a first end fixed to the first end cap and a second end of the valve unit inserted into the inner tube and defining an interior space of the inner tube into a first oil room and a second oil room, the valve unit regulating volume of oil flowing between the first and second oil rooms, the inner tube linearly movable between the outer tube and the valve unit, and
    a restriction unit having a flange extending inward from an inner periphery of the inner tube, a stop member located on the valve unit, the stop member contacting the flange when the inner tube moves to a position so as to restrict the inner tube from dropping out from the outer tube.

2. The bicycle seat tube assembly as claimed in claim 1, wherein the flange is integrally formed to the inner tube and located at a position where the inner tube reaches a maximum distance that the inner tune is exposed from the outer tube.

3. The bicycle seat tube assembly as claimed in claim 1, wherein a range of the inner tube is a sum of the maximum distance that the inner tube is inserted into the outer tube and the maximum distance that the inner tube is exposed from the outer tube.

4. The bicycle seat tube assembly as claimed in claim 1, wherein a second end cap is located to seal an end of the inner tube and the sealed end of the inner tube is inserted into the outer tube.

5. The bicycle seat tube assembly as claimed in claim 4, wherein a first air room is defined between the second end cap and an inner periphery of the inner tube, pressurized air is filled in the first air room.

6. The bicycle seat tube assembly as claimed in claim 1, wherein the valve unit has a rod which has an end fixed to the first end cap, a movable unit is mounted to the rod in the second oil room and is linearly movable along the rod, an outer periphery of the movable unit contacts an inner periphery of the inner tube, a second air room is defined between the movable unit and a second end cap.

7. The bicycle seat tube assembly as claimed in claim 1, wherein a locking unit is connected to the outer tube and located in opposite to the first end cap, the locking unit seals the outer tube and the inner tube movably extends through the locking unit.

8. The bicycle seat tube assembly as claimed in claim 1, wherein the stop member is made by soft material.

9. The bicycle seat tube assembly as claimed in claim 1, wherein the stop member is made by plastic material.

10. The bicycle seat tube assembly as claimed in claim 1, wherein the inner tube comprises a first tube and a second tube, the second tube has a narrow end inserted into the first tube and the flange is formed on the narrow end of the second tube.

\* \* \* \* \*